May 9, 1933. E. THOMSON Re. 18,826
REFRIGERATING APPARATUS
Original Filed July 28, 1923
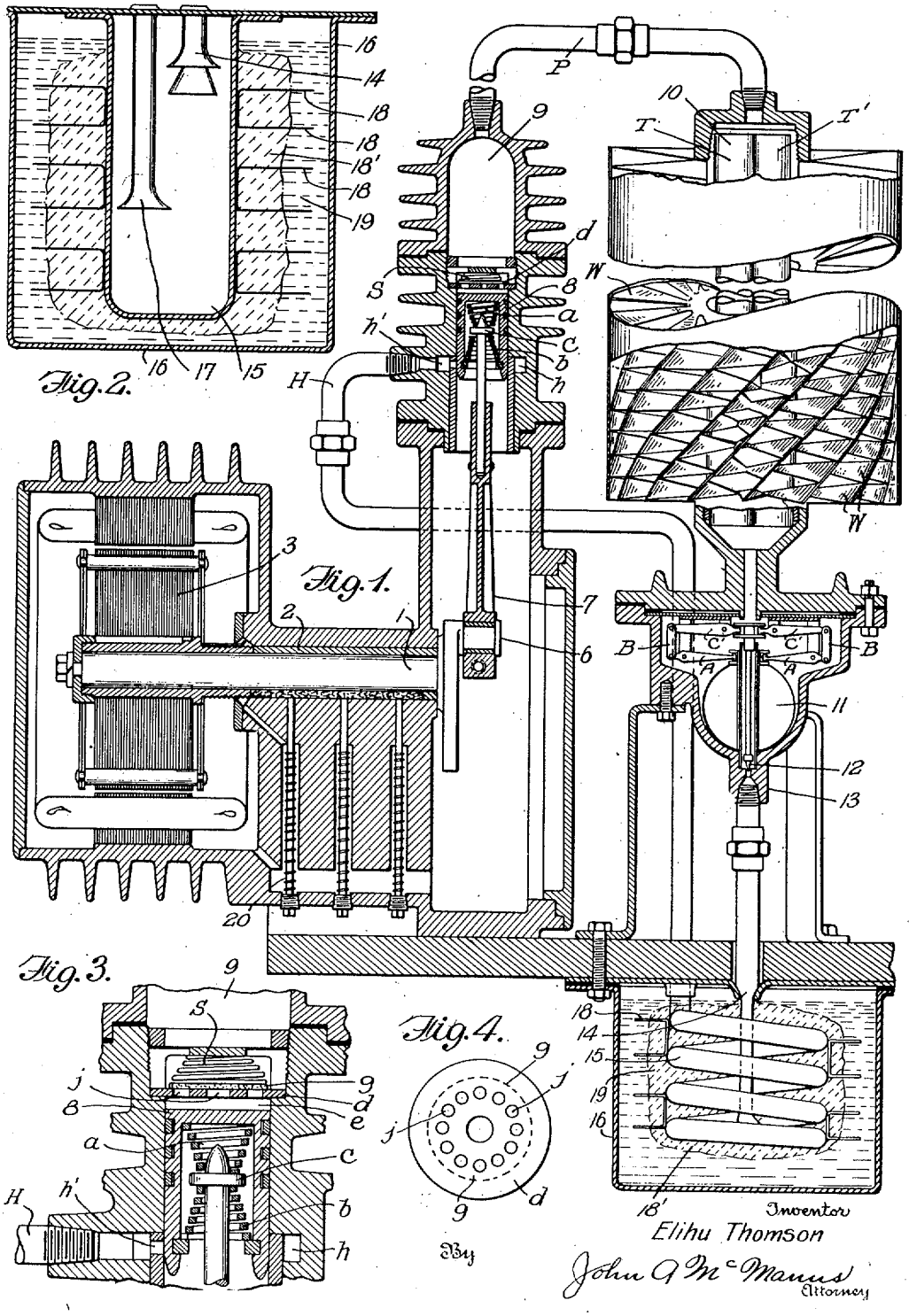

Reissued May 9, 1933 Re. 18,826

UNITED STATES PATENT OFFICE

ELIHU THOMSON, OF SWAMPSCOTT, MASSACHUSETTS, ASSIGNOR OF ONE-THIRD TO JOHN A. McMANUS, OF LYNN, MASSACHUSETTS, AND ONE-THIRD TO JAMES E. GRAHAM, OF NEWTONVILLE, MASSACHUSETTS

REFRIGERATING APPARATUS

Original No. 1,568,102 dated January 5, 1926, Serial No. 654,377, filed July 28, 1923. Application for reissue filed October 17, 1932. Serial No. 638,265.

The present invention relates specifically to refrigerating apparatus, suitable for domestic needs, and which is of the type wherein a liquid of large latent heat of vaporization such for example as sulphur dioxide and its vapor fill the spaces of the refrigerating apparatus, the said liquid being used in very limited amount to secure advantages to be afterward pointed out. The system includes the usual elements of condensing pump and condenser with a cooler or evaporator for vaporizing a liquid gas in attaining refrigeration.

The objects of the invention may be stated to be to provide an apparatus of low cost, and relatively low power consumption for a given output of practical cooling, providing means for regulating in desirable ways the application of the cooling to useful ends and at a rate depending on the call of the apparatus for such cooling; to improve the construction and details of the various elements of the apparatus rendering it more reliable in practice, and to provide further an effective means for conserving the cooling effect by the provision of what I term an effective "cooling barrier" between the evaporator or cooler and the outside air, automatically regulating the access of heat to the evaporator in accordance with the needs. This last mentioned feature constitutes, in fact, a negative heat storage or storage of cold, as it may be termed, which, at the same time, becomes an automatically adjusted conductor for carrying heat to the evaporator or cooler. The particular function of this part of my invention is that it secures a considerable latitude as to times of operation of the motor, which may be cut out, say for several hours, as during the night or at any other time, and operated during the remaining parts of the day, depending on the cooling needed, the interval of non-operation being covered by the period of the stored or negative heat or cooling provided for in the operation of the apparatus. It will be evident that since the consumption of energy is generally that of an electric motor, such power may be drawn from the mains at a time when its cost is the least, or when it is desired to fill in load at the station, and the apparatus can be removed from the system or shut down during the period of light load or the period of overload. In accordance with this idea, it is desirable that the cooling effect of the motor and condensing pump, together with the other appliances, be sufficiently great to only require operation during, say, daytime, with the shut-down during sleeping hours, so that in domestic service it will not be necessary to have the apparatus running during the night, which is a time at which even a slight amount of noise would be disturbing. Whilst automatic regulation to permit predetermined rest periods of compression follows effectively from my ice barrier, any conventional automatic regulation (as by means of a thermostat or such like) may be additionally employed if desired. With the system of cold storage herein provided by means of the ice barrier, the pump, while working continuously during periods of light or no demand for cooling, would be doing substantially no work, as the amount of $SO_2$ in the apparatus is so small in proportion to the spaces therein that there is practically no pressure rise. When, however, the ice barrier melts sufficiently and there is a real demand for cooling, the refrigerant in the evaporator vaporizes, the pressure in the spaces begins to rise and the pump has work to do and performs this work automatically of building up the pressure again to working value.

Instead of using a large lot of liquefied gas, it is possible with the apparatus of my invention to make use of a smallest quantity of liquid, according to the interior capacity of the whole apparatus, and so arrange the cycle that this same liquid can be evaporated and condensed over and over again, without the necessity for providing a reservoir or a considerable storage of liquid $SO_2$, which is the case in sulphur dioxide refrigerating machines heretofore used. This is important because in case of a leak of $SO_2$ a minimum of this refrigerant is available for leakage. The advantage of using this minimum amount of liquid is that when the apparatus is unused or standing idle, no considerable pressure much above atmosphere will ever accumulate and strain the joints. This avoids leakage and difficulty of keeping the apparatus tight.

A further description and figures of my apparatus will deal with the various features of construction to secure the abovementioned results.

My invention further provides in the condensing pump piston, means for automatically adjusting the clearance of the piston in accordance with the load on the pump, whereby when the load is heavy the clearance of the piston from its head is greater than when the load is at a minimum, passing from one to the other condition. This is accomplished by interposing a slightly compressible spring between the piston and its operating connecting rod, which, at the same time, does away with the necessity for any wrist pin bearing, since the swing of the connecting rod is taken care of by the flexibility of the spring connection to the piston.

The motor which drives the pump is demanded to be run in a closed space filled with sulphur dioxide gas, and it has to be constructed with as high efficiency as possible, and this for the reason that economy of power in such a device will amply pay for the increased cost of obtaining better efficiency in the motor. Connections to such motor are, as is usual in such cases, carried through the casing by insulated bushings in the latter, and there will usually be two wires and sometimes a third, either let in through separate bushings in the motor casing, or combined in a cable, this, however, being unimportant and a well known arrangement. To discharge heat from the motor and its casing, it can have fins all over it or wherever it may be found best for conveying heat therefrom. These are constructions so well known that it is not necessary to elaborate them here. Referring to the drawing, Fig. 1 represents a side elevation, mostly in section, of the apparatus of my invention; Fig. 2 represents a modification of the so-called "cooling barrier" or low pressure cooling circuit for increasing the overall efficiency of the apparatus; Fig. 3 represents an enlarged section of the mechanism for automatically limiting the movement of the compression piston in accordance with the variations in pressure of the refrigerating vapor; Fig. 4 represents a plan view of the valve seat between the compression pump and compression chamber above the compression pump. It is preferred that the shaft 1 on which the rotor is carried shall have a single bearing 2 because of its greater simplicity for lubrication instead of the usual two bearings. The other end of the shaft from that carrying the rotor 3 bears a crank and crank pin 6, the eccentric of which is proper for the traverse of the piston actuated by the connecting rod 7. An air cooled casing 4, to which is secured a stator 5 encloses the rotor 3, shaft 1 and oiling arrangements therefor.

In Fig. 3, will be found the preferred construction, in general terms, of the connection between the piston 8 and the connecting rod 7. This is accomplished not by the usual wrist pin arrangement, but by providing two strongly opposed springs *a* and *b* of well tempered steel, the excursion of which is always well within the limit of elasticity. These springs are opposed and bear upon a flange or extension *c* of the connecting rod laterally, as shown, while they are secured firmly into the interior space of the piston body. In this way the connecting rod can swing from side to side, as is needed in making the stroke, and at the same time, under spring pressure the piston can move slightly longitudinally to the connecting rod. This means that if the piston is opposed by a high pressure in passing up to the head *d* of the cylinder, the clearance space *e* in the cylinder will be adjusted to a little larger amount than if the back pressure on the piston *f* is small. In the head *d* of the cylinder are perforations *j* upon which rest an unperforated disk or valve *g* having sufficient clearance between its circumferential edge and the inner wall of the chamber 9 to allow gas to pass by said disk or valve into said chamber when the pressure is sufficient to cause the valve *g* to rise and to lift said disk or valve against the compressive force of the spring S. It will be seen that by this arrangement the pumping is not by a constant traverse of the piston, but one which is shortened somewhat, though to a small degree, by the load on the apparatus being greater; that is, if the piston has to compress a dense gas it can yield somewhat, especially when the back pressure into the condenser into which it is feeding the gas is higher. On the other hand, if the gas is comparatively rare and of low pressure or density, the clearance space *e* is not so increased by the pressure, but the piston makes substantially its full stroke without any diminuation whatever. It is contemplated in the use of the invention that there shall be considerable variation in the density of the gas which is being pumped, and also in the back pressure of the condensing chamber, especially at the start. The intake openings which feed the gas into the space above the piston are indicated as a set of openings *h* and *h'* in the sleeve which are uncovered at the lowest part of the stroke of the piston. All these openings are fed from the intake pipe or conduit H leading thereto. This may be modified considerably without affecting the nature of the invention; and, in fact, the arrangement chosen is adapted because of its great simplicity. To be more specific, the advantage of the yielding spring may be described further. When the pressure in this condensing chamber becomes very excessive, that is, more than a predetermined amount, the valve is maintained nearly, or quite, closed until the pressure falls off to a value below that which the pressure of the spring in the piston can exert when the valve is again opened and the pressure again builds up to the desired value. In this way a very desirable automatic regulating mechanism for the pressure in the system is obtained, and in addition a very effective regulator providing against injury to the apparatus by "blowing up" due to an abnormal increase of pressure which might occur in case of an air leak inwards. This arrangement automatically regulates the untraversed space so that it is small when the pressures are low, and much larger when the pressures are high.

The piston, when drawn down, leaves a partial vacuum back of it which fills at once on the uncovering of the openings or passages *h* and *h'* in the walls of the cylinder when the end of the piston passes them in its outward stroke. These are covered at once on the return stroke and the only active valve is the one at the head of the cylinder, which in this case, may be a flat valve *g* as indicated at Fig. 4. Above the valve there is preferably a slight expansion chamber 9, the cylinder itself being provided with cooling wings, since the greater the amount of heat which can be dissipated at this part of the apparatus, the better will be the economy. A duct or conduit pipe P leads from the passage 9 over to the interior of what may be called a condenser or liquefying chamber within the shell 10. This consists preferably of a more or less cylindrical body or shell capped at each end, and in the interior of which have been slipped a number of hollow tubes say four T and T', etc. or sheet metal flues, so as to increase gradually the interior surface exposed to the gas. These tubes may be in a group which bear upon the outer sides and bear upon each other, so that good heat conduction may take place between the outer walls and the inner parts of the structure, and both the shell 10 and inner structures may be made of a good conducting metal, such as copper. Surrounding the shell 10 and extending from it is a series of fins or wings W made in good conductive relation thereto, as by tinning or soldering, and these wings or extensions are staggered circumferentially with relation to one another whereby the air will successively flow over the multiple metallic fins and absorb heat therefrom thus cooling the condensed $SO_2$ in the multiple tubes and spaced in such a way that they give great freedom to the passage of air upwards and between and through and about them for the removal of heat or convection currents. They are very numerous, and while they might be exposed to a current of air without further attention, they are preferably jacketed by an outer drum in contact with the projections, so to speak, this outer drum being of thin sheet metal of only such strength as is necessary to provide air currents as need be, or to allow handling without destruction or deformation. This outer drum furnishes or acts as a chimney in its vertical relation, whereby air is drawn in at the base between the projections or wings of the shell 10 and delivered above in consequence of the fact that the air is somewhat heated in passing the wings or projections, and functions as a chimney draft. It is, however, preferable to extend this shell upwardly to a height above the shell 10 maintaining its tightness and making it act still more effectively as an up-cast draft chimney, increasing greatly the flow of heat from the wings or fins into the body of air which is thus actively passing them. It is, of course, presumable that such chimney may, if it is convenient to do so, be extended at still greater length in any ready way, such, for example, as turning the chimney extension directly into a flue whereby a chimney draft of the ordinary type is added to the effect before described. This is very desirable, and decidedly effective. As there is no damaging heat concerned in the appliance, the extension of the chimney may be made even of wood extending up towards the roof of a building. These devices effectively obviate all necessity for water cooling, which has been a decided bugbear in many types of refrigerating apparatus. The shell or receptacle 10 or condenser, as it may be termed, receives from the pump sulphur dioxide gas only, but at such a pressure that when it loses heat from the wings, it condenses into liquid sulphur dioxide, which trickles down in the interior, and finally is discharged into a small float chamber, which has much the structure or appearance of a carbureter float valve arrangement employed in gasolene feed for automobiles. There is a hollow float 11 connected by a system of levers to a small conical or needle valve 12 tightly fitted to its seat in the valve box 13. The leverage connection between the float and the valve is made so that the float moves, say, twelve times as far as the valve will move. This means that a slight amount of fluid surrounding the float 11, namely, sulphur dioxide liquid, lifts the float on a certain accumulation having taken place, and opens the needle valve 12, allowing this accumulation to run through the needle valve, thus lowering the level of the liquid in which the float exists, and immediately causing complete closure of the valve. These intermittent feeds of sulphur dioxide liquid pass down into the evaporating chamber or cooler through the pipe 14 which is a tube of small bore, entering into the base of a cooling coil 15. Therefore, in general the arrangement consists of a hollow vessel shown as a sphere of light metal and empty, or a solid body of very light material may take its place. The stem of a valve 12 passes through an opening in the center of this float body downward, which stem actuates the valve to open and close it. The valve is of small dimensions and fits closely to its seat in the ordinary way. The float body in rising will, as is seen, lift the long arms of two levers A—A provided with stationary fulcrums, the short arm outwardly extending being linked by a pair of links B—B to the long arm of a second set of levers C′—C′ fulcrumed in fixed position from the upper cover while the short arm is an extension which engages between two discs centering on the valve stem itself at its upper end. Thus an upward movement of the float lifts the valve but at a slower rate than the float itself moves. The float body fits closely the chamber in which it rests, but it is free to rise when liquid coming down from the condenser above surrounds it and falls to a certain level in the cup within which it rests. The parts are so balanced that the pressure existing normally between the condenser space and the evaporator space below will hold the valve shut until sufficient liquid immersion of the float body has taken place. At this moment the float body will have a tendency to rise sufficiently to overcome the pressure difference which holds the valve shut. On the float rising and opening the valve, the pressure difference is in part neutralized and the float overshoots or rises beyond mere equilibrium, thus permitting a rapid emptying of the space around the float of the liquid accumulated therein. The sulphur dioxide refrigerant being of very low viscosity, escapes rapidly as a liquid into the evaporator and the float, a little behind time, comes down and recloses the valve, but not until practically all of the condensed liquid has been discharged. This operation is repeated at intervals. This coil 15 corresponds to the ordinary cooler in the refrigerating system exposed by its surface to the cooling of air or the cooling of water in a refrigerating box.

My invention, however, contemplates a further step, in that in normal operation the coil is submerged in a freezable liquid, such as water, whereby the space surrounding the coil becomes an ice box or ice block more or less extended. As the box is sealed it is not filled with water, but an expansion space is allowed above it, so that on freezing there will be no overflow nor rupture of the box. The box containing the water as an example is of sheet metal, such as copper, though any suitable metal for the purpose may be employed, and conducts the heat inwardly from the outside, as in the cooling operation. In operation, under these circumstances, there will form a coating of ice 18′ around the coil and the water interior thereto will gradually freeze, as well as the water 19 exterior thereto, and a coating will gradually thicken as the cooling advances, provided that there is not a large excess of heat from the outside tending to keep the ice melted as fast or faster than it forms. Should the demand for cooling be continually lessened, then the ice layer 18′ will gradually extend, and it may be conceived at the last as leaving no water unfrozen in the space or box 16. This is the extreme case, for during the process of freezing of the ice layer all over the coil 15, there comes into play another function; that is, the ice being a fair non-conductor of heat, the flow of heat as the layer thickens is gradually more and more cut off, resulting in an automatic adjustment of the heat flow to the coil, or a stoppage of the heat flow to the coil when the demand is small, and the storage of the negative heat, or, as one may say, of the cold around the coil. There are at least two results of this happening. In the first place, the temperature of the coil itself falls so that the sulphur dioxide in the apparatus will accumulate there and not be rapidly evaporated, at the same time that the pressure on the working pump will fall, since the gas which it gets from the evaporator or cooler becomes more and more rare, or approaches more and more a partial vacuum, while at the same time the effect of the cooling of the condenser 10 goes on a pace and reduces its temperature, and consequently the back pressure on the pump, thus saving power when the load is light, and at the same time saving wear and tear on the apparatus, everything working, as it were, favorably to increase economy. By means of the above mentioned process also supercooling is prevented without the use of thermostatic or pressure control necessarily, because the temperature in the refrigerator box can never fall below the temperature of the freezing liquid. Such liquid may be plain water with a mixture of a slight amount of other substance, the purpose of such mixture simply being to lower the temperature in the ice box a slight amount below 32° F. when such is desired.

Now, if, at this time, the pump be shut down by shutting off the driving power of the motor, there will be an accumulation in the condenser of substantially all the free sulphur dioxide liquid possible to exist therein, and there will also be a mass of ice around the cooler or evaporator coils. In this way, we have secured a storage which may continue the refrigerating action of the apparatus for a considerable time while it is shut down. As the apparatus rests and heat reaches the tank 16, there will be, of course, a reduction of the amount of ice which is supplanted by water, and later an evaporation of the sulphur dioxide contained in the condenser coils with a fair equalization of pressure throughout the whole apparatus. If now the starting current is put on the motor, it carries the piston over center and starts to run with very little load and an entirely favorable condition, and gradually accumulates in the pumping process the former difference of pressure between that in the condenser 10 and the space below the pump piston and in the evaporator or cooler. This series of actions just detailed is pointed out as constituting a regulating feature of the layer of ice, which I call the ice barrier around the cooling coil or receptacle.

In Fig. 2, the evaporator coil 15 is modified to be a chamber 15 with an inlet tube 14 for allowing the liquid spray from the valve 12 to enter, and a pipe 17 returns to the pump of Fig. 1, the sulphur dioxide vapor. It may be here mentioned that in Fig. 1, the cooling coil or evaporating coil 15 will have attached to its outer surfaces extensions of the metal in the form of wings or vanes 18 for the purpose of extending the action of the cooling coil for a distance outside of its own body. This is, however, best illustrated in Fig. 2, in which these extensions, are projections 18, 18, 18, etc., which may be discs surrounding the chamber 15, or star shaped pieces or even separate projections attached thereto or otherwise outwardly. They virtually make the outside of the vessel 15 a more extended surface and lessen the intensity of the difference between the outer layers of the surrounding liquid and the inner layers of ice when frozen. They, in other words, modify the acuteness of the barrier which forms around the inner chamber by the freezing of the surrounding water in the vessel 16, and are capable of being adjusted or regulated by construction to any circumstances which may be found most favorable to be met, and this may vary under different applications.

The shaft 1 Fig. 1 is, as it will be seen, oiled by a set of wick oilers coming up from oil spaces below, as is marked 20. There is little lubrication needed as a single bearing is used, and it is of such a nature as not to demand a great amount of lubrication. It is desirable to arrange the lubrication drip to be taken up again and be reconveyed to the bearing after it has passed through a piece of felt for filtering.

While many forms of valve may be suitable, even automatic valves, for the exit valves over the pump cylinder above the piston, a simple valve *g*, Fig. 4 may be illustrated as effective for the purpose, which consists of a flat sheet of substance, such as hard rubber, of small thickness and preferably internally reenforced by metal bars or wire pressed down by a spring S (shown in Figs. 1 and 3) over a series of holes *j*. This valve has been used with success.

The operation of the device is as follows:

The machine is first charged with the requisite amount of liquid, the pump is started into operation, the liquid evaporating instantly, and it is taken up by the pump in the vaporized form. Before the liquid is injected into the machine, however, the machine must be exhausted as completely as possible of air in order that there will be no air compressed over and over again, which would result in doing work on air, from which there would be no benefit and it would act as a clog. The object is to compress pure sulphur dioxide gas. The gas is then pumped to the condensing chamber, where the heat of compression is lost externally by means of the condenser. The gas then liquefies and runs down into the float valve chamber. When a sufficient amount of liquid has accumulated in this chamber, the needle valve opens and emits a small quantity of liquid to the evaporator chamber or expansion vessel, which is in the ice box. Or, this evaporator or expansion coil may be a conventional coil of copper pipe, or it may take the form or structure shown in Fig. 2 of the drawing. When the liquid reaches the evaporating coil in turning into a gaseous state, it takes up the necessary heat to accomplish this transformation from the surrounding medium. The gas is then returned to the compression pump and the cycle repeated.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States is:

1. In a refrigerator the combination of a compressor having a spring supported piston yielding increasingly as compression pressure increases to reduce supply of a volatile refrigerant and reduce the compressed charge under increasing back pressure, a condenser having multiple metallic fins a chimney carrying air for condensation in amount corresponding to increase condenser temperature, controlling means at the outlet of said condenser comprising an automatic intermittent valve, an evaporator receiving refrigerant periodically in small increments, and a water tank of such capacity as to permit a graduated thickness of ice as a thermal barrier in amount to cover rest periods from compression, said tank surrounding and closely adjacent to the evaporator.

2. In a refrigerator a storage tank for frozen liquid, an evaporator containing liquefied volatile refrigerant in close thermal relation to said tank, said evaporator having radiating heat conducting extensions proportioned relatively to the tank capacity to permit a thickness of ice due to evaporation of liquefied refrigerant to form and to retard evaporation of refrigerant at predetermined low pressure during a desired period of rest from compression.

3. In a refrigerator a tank for containing a freezable liquid, an evaporator within the tank for evaporating a volatile refrigerant, a compressor in operative relation with said evaporator, fins of large superficial area around the evaporator in close heat conducting relation thereto and within the tank; a condenser, and a valve operated automatically under a differential condenser and evaporator pressure to permit feeding of regulable quantities of liquefied refrigerant to the evaporator.

4. A refrigerator having a container for liquefied volatile refrigerant, a water tank surrounding said container, metallic fins in the tank in intimate thermal contact with the container proportioned in area to tank capacity so that in normal operation uncongealed water will always be maintained and a variable thickness of ice, formed according to rest periods from compressor operation, may be effected to prolong the cold during said rest periods, a compressor, a condenser, and a valve to permit the automatic feeding at intervals of small quantities of liquefied refrigerant to the evaporating chamber whereby a definite low temperature may be held substantially constant during service.

5. A refrigerator containing the following elements asembled; a chamber having volatile refrigerant, a pump or compressor supplied from said chamber and delivering such volatile refrigerant under pressure to a condenser chamber surrounded by extended fins constituting draught spaces for cooling air passing over them, an evaporator arranged with an outlet in connection with the intake of the compressor, a tank outside the evaporator, a body of freezable liquid in said tank, extensions or fins of heat conducting metal on the outside of the evaporator itself, a controller valve, and means to close and open said valve automatically and intermittently in passing condensed liquid from the condenser chamber or space to the evaporator.

6. A method of refrigeration consisting in compressing in variable volume dependent on back pressure of compression a condensible gas of large latent heat such as sulphur dioxide, cooling the same to liquefaction, releasing the liquid as needed at suitable pressure for cooling, conveying the cooling effect to a second liquid to form an ice block allowing a free space for expansion of such liquid by freezing, and by-passing heat through or around the accumulating body of frozen liquid to store cold to cover rest periods of functioning and enhance the overall efficiency, and also to reduce the temperature drop in regulating supply of gas and liquefaction.

7. In a refrigerator a compressor for compressing liquid refrigerant, a closed storage tank for frozen liquid, an evaporator containing liquefied volatile refrigerant in close thermal relation to said tank, said evaporator having radiating heat conducting extensions proportioned relatively to the tank capacity to permit a thickness of ice due to evaporation of liquefied refrigerant to form and to retard evaporation of refrigerant at predetermined low pressure during a desired period of rest from compression while the compressor is stopped.

8. In a refrigerator a sealed storage tank for frozen liquid having an expansion space, a compressor for compressing liquid refrigerant, an evaporator containing liquefied volatile refrigerant in close thermal relation to said tank and in substantially non-convective relation therewith surrounded by the frozen liquid, so that practically the whole cooling effect of the evaporator is conveyed only to and through said liquid, radiating heat conducting extensions on the evaporator proportioned relatively to the tank capacity to permit a thickness of ice due to evaporation of liquefied refrigerant to form and to retard evaporation of refrigerant at predetermined low pressure during the desired period of rest from compression, while the compressor is stopped.

ELIHU THOMSON.